INVENTORS
FELIX ROSENTHAL
WEBSTER C. ROBERTS
ROBERT F. KREJCI

BY Francis N. Masselle
ATTORNEY

United States Patent Office 2,969,827
Patented Jan. 31, 1961

2,969,827

AUTOMATIC WIRING MACHINE

Felix Rosenthal, East Cleveland, Webster C. Roberts, South Euclid, and Robert F. Krejci, Cleveland Heights, Ohio, assignors to Clevite Corporation, Cleveland, Ohio, a corporation of Ohio Filed Sept. 24, 1956, Ser. No. 611,440

7 Claims. (Cl. 153—20)

This invention relates to an automatic wiring machine employing the wire-wrapping technique for making electrical connections.

Unless contrary to context, the terms "axis" and "axes" are employed to denote, in the singular or plural as the case may be, transversely related coordinate axes according to usage in the field of analytic geometry.

Recently there has been developed a wire-wrapping tool, described in "Bell Laboratories Record," August 1955, in which the usual insulated wire used for making electrical connections is stripped of its insulation and wrapped tightly around a terminal in a single stroke of the wiring tool. Preferably the terminal has one or more sharp edges and the tool applies tension to the wire as it is being wrapped around the terminal. An extremely tight electrical connection between the wire and the terminal is formed as a result of this action of the tool.

In accordance with the present invention, a pair of such wiring tools is provided for use in making connections between any two terminals on a modular terminal panel, which has terminals spaced apart by modular distances. Initially one of the wiring tools is positioned over one of the terminals to be interconnected. The other wiring tool, initially located adjacent to the first tool, moves across the terminal panel, carrying with it the free end of the wire, over to the other terminal. Then both tools are actuated to wrap the wire around the respective terminals in the usual manner. A dressing finger is provided which moves with the second wiring tool along one coordinate axis only of its path of movement and provides a location around which the wire is bent when the second tool is displaced from its initial position along that coordinate axis and along another coordinate axis at right angles to it. The dressing finger is provided with means for disengaging it from the wire when the terminal connections are made, so that the dressing finger is free to move to the next wiring location. The terminal panel itself is mounted for angular adjustment in 90° increments about an axis perpendicular to its plane to facilitate the wiring operations.

It is an object of the present invention to provide a novel machine for automatically wiring a terminal panel using a pair of wire-wrapping tools for making the electrical connections to the terminals.

It is also an object of this invention to provide such a wiring machine which is particularly adapted for the high speed wiring of such terminal panels.

Another object of this invention is to provide a novel wiring machine employing two wire-wrapping tools in which the wire-carrying tool is able to move across the terminal panel simultaneously in the direction of X and Y coordinate axes at right angles to one another.

A further object of this invention is to provide such a wiring machine having a dressing finger which coacts with the wire in a novel manner to insure the snug positioning of the wire on the terminal panel.

Other and further objects and advantages of the present invention will be apparent from the following description of a presently preferred embodiment thereof, illustrated in the accompanying drawings.

Figure 1:
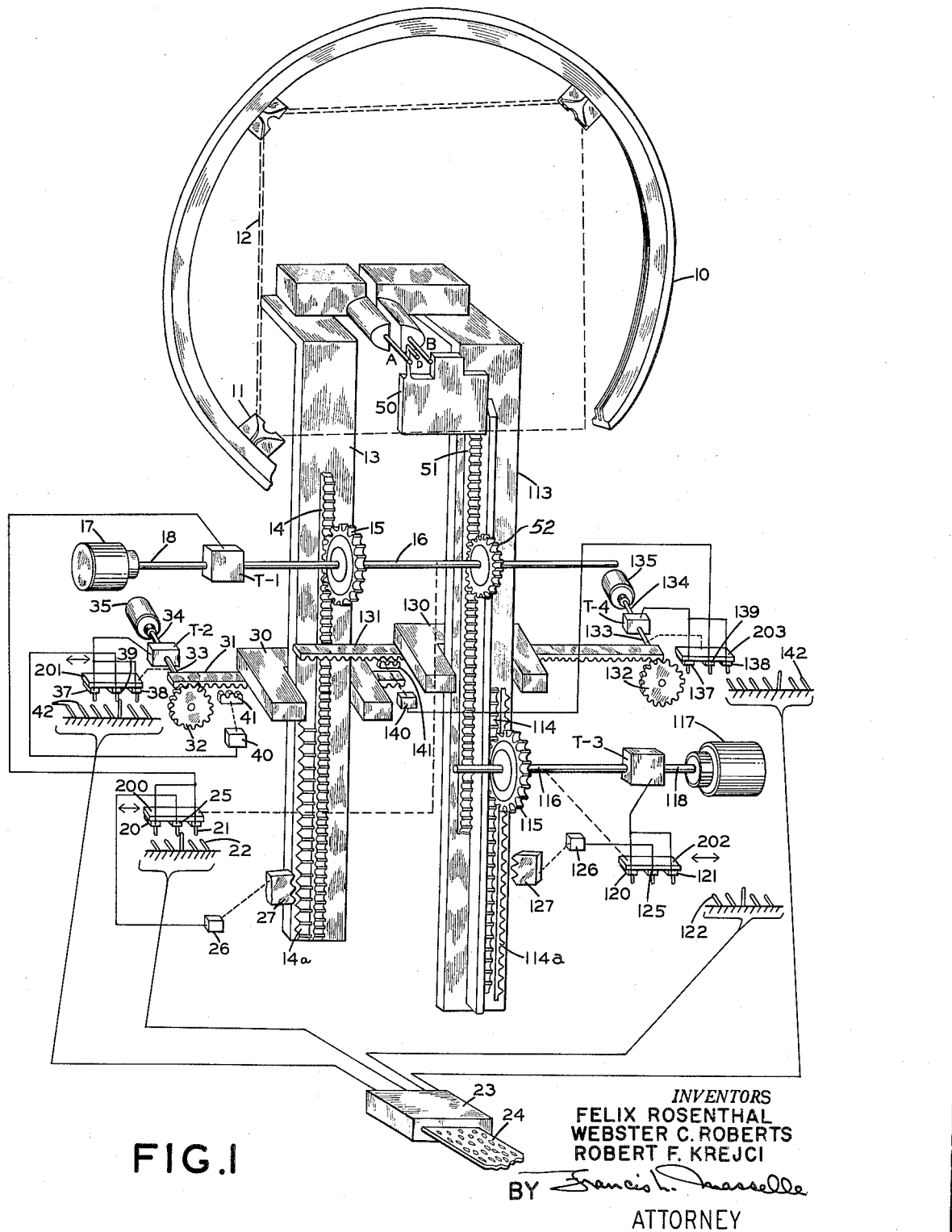
Figure 1 is a schematic perspective view, viewed from the front of the machine and with parts broken away for clarity, showing the present wiring machine with the wire-wrapping tools and dressing finger positioned at the start of a wiring operation.
Figure 2:
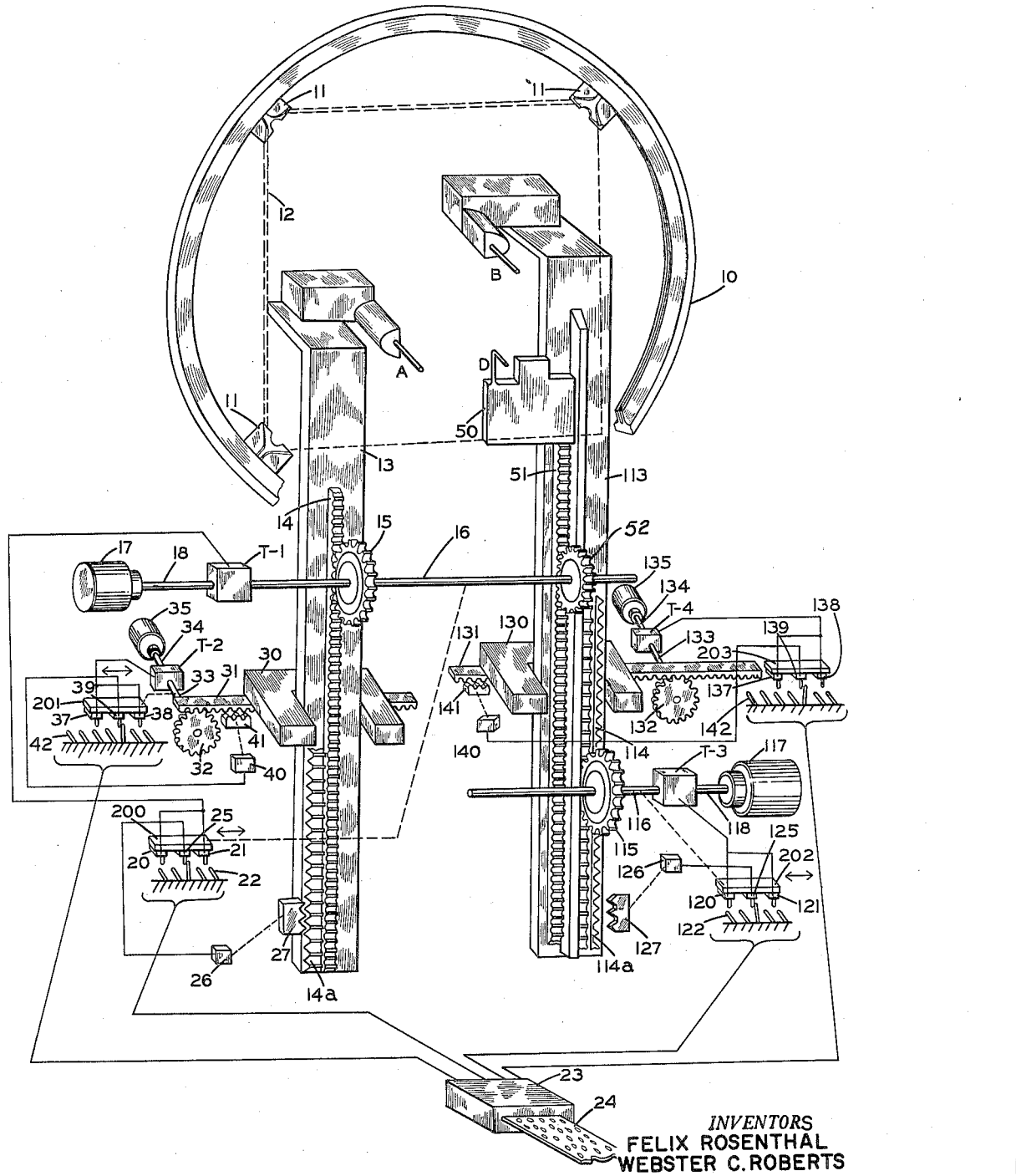
Figure 2 is a similar view showing the position of the parts just before the completion of the wiring operation.

Referring to the drawings, in accordance with the present invention there is provided a ring 10 which at its inner periphery carries four support members 11, which receive the corners of the terminal panel 12 and support the board, indicated in dotted lines in Figs. 1 and 2.

Located behind the ring 10 are wire-wrapping tools A and B of the type previously referred to. These tools are conventional and, inasmuch as it is not necessary to an understanding of the present invention, they are not shown or described in detail. While these tools may take various specific forms, one found completely satisfactory for the purposes of this invention is illustrated and described in the report of the RETMA Symposium on Automation held on September 26 and 27, 1955, at the University of Pennsylvania, Philadelphia, Pa. This particular wrapping tool is manufactured by the Keller Tool Division of Gardner-Denver Company, Grand Haven, Michigan. Its wrapping spindle is rotated by an air motor; advance and retraction of the spindle also are accomplished pneumatically. The A tool is mounted on a vertically-movable support column 13 to which is attached an elongated rack 14 which meshes with a gear 15. Gear 15 is suitably splined to a rotatable shaft 16 so as to turn therewith and be capable of sliding lengthwise along shaft 16. Shaft 16 is normally driven at high speed from motor 17 through a two-speed transmission T–1 coupled between the output shaft 18 of the motor and shaft 16. The transmission T–1 also is adapted to drive the shaft 16 at low speed from motor 17.

Transmission T–1 is connected to be operated by each of two precision snap acting switches 20 and 21 which are mounted in spaced relation on a support 200. Support 200 is suitably geared to shaft 16 so that rotation of this shaft causes corresponding linear movement of support 200. These switches are positioned to be actuated by one of a plurality of fingers 22. The fingers 22 are mounted on a fixed support and are spaced apart by equal distances corresponding to the modular spacing on the terminal board 12. These fingers are under the control of a tape reader 23 which is operated by a perforated code tape 24. Depending upon the operation of the tape reader, one of the fingers 22 is actuated to project into the path of the movement of switches 20 and 21 when the support 200 moves in response to rotation of shaft 16. The other fingers remain out of the way so as to be incapable of operating these switches.

The spacing between adjacent fingers 22 may be the same as, or different from the modular spacing on terminal board 12. The gear ratios in the drive between shaft 16 and support 200 determine the proper spacing of the fingers 22 along support 200 corresponding to a modular vertical space on panel 12. Therefore, the fingers 22 may be given any desired spacing, provided the proper gears are provided in this drive.

Another similar precision snap acting switch 25 is carried by support 200 midway between switches 20 and 21 so as to be actuated by the operative latch finger 22 shortly after one or the other of switches 20 and 21 is operated, depending upon whether the A tool is moving up or down at the time. Switch 25 controls an actuator 26 which operates a toothed brake member 27. Brake member 27, when operated, engages the teeth of a rack 14a on column 13 to stop the vertical movement of column 13. Except in response to the operation of switch 25, the brake member 27 is normally disengaged from rack 14a.

The position of the selected finger 22 along support 200 corresponds to the vertical position on the terminal board 12 where the A tool is to be located.

In controlling the vertical position of the A tool, if it is desired to lower the A tool, the motor 17 is suitably energized and it drives shaft 16 initially at high speed through the transmission T-1. The vertical position at which the A tool will stop is determined by which one of the latch fingers 22 is operative, which in turn depends on the command given by the perforated tape 24. As the A tool moves downward, the switch 21 on support 200 first will engage and be operated by the operative latch finger. This causes transmission T-1 to drive shaft 16 at low speed from motor shaft 18, thereby considerably slowing down the speed of vertical movement of the A tool. Then, when the middle switch 25 is engaged and operated by the finger 22, it causes actuator 26 to move the brake member 27 into engagement with rack 14a to stop column 13 and the A tool at this point.

A similar action takes place if the A tool is moved upward, in which case switch 20 is first operated to slow down the vertical movement of the A tool, and shortly thereafter switch 25 is operated to stop the A tool.

Horizontal movement of the A tool is controlled in a similar manner. A generally U-shaped yoke 30 extends around column 13, so that when displaced horizontally the yoke carries column 13 with it. Yoke 30 carries a horizontal rack 31 which is driven by a gear 32 carried by shaft 33. Shaft 33 is selectively coupled to the output shaft 34 of motor 35 through a two-speed transmission T-2. The transmission is under the control of a pair of switches 37 and 38 spaced apart along a support 201. Support 201 is suitably geared to shaft 33 such that rotation of this shaft causes corresponding longitudinal movement of the support. Another switch 39 is mounted on this support midway between switches 37 and 38 and is connected to an actuator 40 to control the operation of a toothed brake member 41 adapted to engage rack 31 to stop the same. The switches are under the selective control of a plurality of fixedly positioned fingers 42, which are selectively individually operated by tape reader 23 under the control of perforated code tape 24.

When tape 24 commands the A tool to move to a particular horizontal position, motor 35 is energized and initially drives the rack 31 at high speed through the transmission T-2. When the A tool is almost at the desired horizontal position, one or the other of switches 37 and 38 is actuated so as to disconnect the high-speed drive and connect the low-speed drive in transmission T-2 between motor 35 and rack 31 to slow down the rack. Shortly thereafter switch 39 is operated to cause the horizontal movement of rack 31 to be stopped, thereby stopping tool A at the horizontal position commanded by tape 24.

The second wire-wrapping tool B of the same type is similarly mounted in back of ring 10 and the terminal board 12 carried thereby.

The B tool is mounted on a column 113 which carries an elongated vertical rack 114 driven by a gear 115. Gear 115 is splined to a rotatable shaft 116 so as to turn therewith, as well as being capable of sliding lengthwise along this shaft. Shaft 116 is driven from motor 117 through a two-speed transmission T-3 driven from the output shaft 118 of motor 117. Normally transmission T-3 operates to drive shaft 116 at high speed. However, when operated by either of a pair of snap acting switches 120, 121 the transmission drives shaft 116 at low speed from motor 117.

The snap switches 120 and 121 are mounted on a support 202 geared to shaft 116 so as to be moved longitudinally in response to rotation of the shaft. A plurality of fingers 122 are mounted adjacent the path of movement of support 202 and are selectively individually operated by the tape reader 23 under the control of the code tape 24. These fingers correspond in number to the respective modularly spaced vertical positions which tool B is capable of assuming and these fingers are spaced apart in succession by distances corresponding to these modular spacings. Only one of these fingers 122 is operated at a time to project into the path of movement of switches 120 and 121 when column 113 moves vertically. Which one of these fingers is so operative is determined by the command given by tape 24. At this time, the other fingers remain out of the way so as to be ineffective to operate the switches.

Midway between switches 120 and 121 on support 202 is a third snap switch 125. Switch 125 is operated by the operative finger 122 shortly after one or the other of switches 120 and 121 is operated, depending upon whether column 113 is moving up or down at that time. Switch 125 is connected to the actuator 126 for a toothed brake member 127. Normally, brake member 127 is disengaged from a rack 114a on column 113. However, when switch 125 is operated the actuator 126 operates brake member 127 to move into engagement with the rack 114a to hold column 113 and the B tool against further movement vertically.

For controlling the horizontal position of the B tool there is provided a yoke member 130 which engages column 113 on either side and which is mounted on a horizontally movable rack 131. Rack 131 is driven by a gear 132 carried by shaft 133. Shaft 133 is driven selectively at either high speed or low speed through a transmission T-4 connected between the output shaft 134 of motor 135 and shaft 133. Transmission T-4 is controlled by each of a pair of snap switches 137 and 138 mounted on a support 203 geared to shaft 133 so as to be displaced in response to rotation of this shaft. Another snap switch 139 is mounted on support 203 midway between switches 137 and 138. Switch 139 controls the operation of actuator 140, which in turn, controls the operation of a toothed brake member 141 adapted to engage rack 131 to lock the B tool against horizontal movement. The switches 137–139 are under the selective control of a plurality of fixedly located fingers 142, which in turn are individually selectively operated by tape reader 23 in response to the command given by perforated tape 24.

The control over the vertical and horizontal movements of the B tool is essentially similar to the described operation of the A tool, and hence a detailed description of it is deemed unnecessary.

Figure 6:
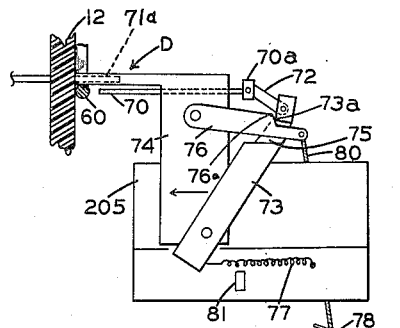
Figures 6 and 7 are similar views illustrating successive positions of these parts while the wire-wrapping operations take place.
Figure 7:
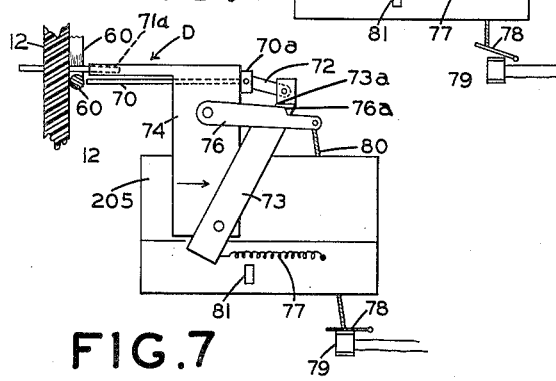

In accordance with the present invention, there is provided a dressing finger D carried by a support 50 which is attached to a rack 51. As shown in Figures 6 and 7, the free (forward) end 71 of dressing finger D is hollowed as at 71a to receive a terminal post. Rack 51 extends vertically down the front of column 113 and is suitably keyed to this column so as to move with the column in the horizontal direction and to permit relative vertical movement between this rack and the column. Rack 51 is driven by a gear 52 carried by shaft 16. Gear 52 is suitably splined to shaft 16 to rotate therewith and to be slidable lengthwise along this shaft.

With this arrangement the dressing tool D is carried by the support column 113 for the B tool so as to move horizontally with the B tool. However, due to the keying of rack 51 on column 113 and the mounting of gear 52 on shaft 16, the vertical position of the dressing finger D is determined by the vertical position of tool A.

Figure 4A:
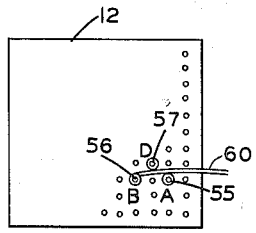
Figures 4a, 4b and 4c are schematic elevational views from the back of the machine showing the positions of the wire-wrapping tools and the dressing finger during successive stages in the wiring operation of the machine.
Figure 4B:
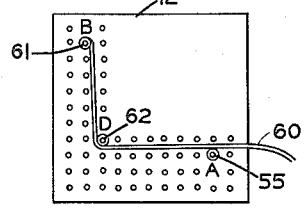
Figure 4C:
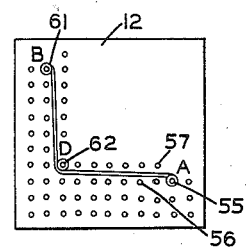

The purpose of this particular arrangement will be more readily understood by referring to Figs. 4a, 4b and 4c. These figures represent the respective positions of the A and B tools and the dressing finger D at the beginning and end of a particular wiring operation.

Initially, referring to Fig. 4a, the A and B tools are adjacent one another, with the B tool at the same vertical position as the A tool and spaced apart from it horizontally by two modules. The A tool is at terminal position 55 and the B tool at terminal position 56 on the board. At this time the dressing finger D is located one modular space vertically above the A and B tools and horizontally is midway between these two tools, at terminal position 57. The wire 60 is connected at one end to the B tool and passes between the dressing finger D and the A tool, as shown in Fig. 4a.

The B tool is then moved both horizontally and vertically to the terminal position 61 (Fig. 4b) up and to the left of its original position 56. The dressing finger D moves horizontally with the B tool for the same distance but remains at its original vertical position since the A tool remains fixed. Because the dressing finger D was one module to the right of the B tool originally, it remains one module to the right throughout such movement. Also because the dressing finger D is located one module vertically above the A tool, the wire 60 wraps around the dressing finger through a right-angle turn, as shown in Fig. 4b, at the terminal location 62.

With the elements of the machine in this position, both of the wire-wrapping tools A and B are actuated to wrap the adjacent portions of the wire around the terminal posts at locations 55 and 61, respectively, and in the usual manner (Fig. 4c).

Since the dressing finger D is supported so as to be one modular space above the A tool and one modular space to the inner side of the B tool, it will be evident that whenever the A and B tools overlie terminal positions on the board 12 the dressing finger D also will overlie a terminal position. This may be taken advantage of by providing a terminal post at the terminal position 62 to which the dressing finger D is carried when the B tool moves to wire-wrapping position (Fig. 4b). The wire 60 extends snugly around this terminal post where it makes a right angle turn. In this manner the wire 60 is kept snug on the board 12 between its wrapped connections to the terminal posts at terminal positions 55 and 61.

In accordance with the present invention, the dressing finger D is provided with a wire release which disengages the wire from the dressing finger just after the wire-wrapping operation takes place at the other terminals.

Figure 5:
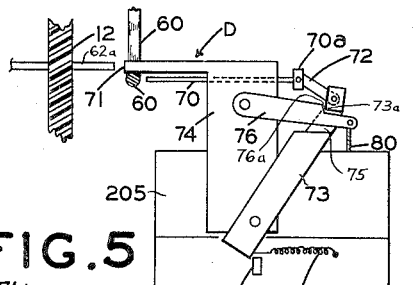
Figure 5 illustrates schematically the positions of the dressing finger and its associated wire release just before the wire-wrapping operations of the tools take place.

Referring to Figs. 5 and 6, there is provided a pin 70 reciprocably mounted for movement just below the cylindrical extremity 71 of the dressing finger D. Pin 70 is connected pivotally to a link 72 which in turn is pivotally connected to the upper end of an arm 73. At its lower end arm 73 is pivotally mounted on a movable support 74 integral with the dressing finger. Near its upper end the arm 73 is cut away at 75, where it receives the reduced inner end of a latch 76 pivoted at its opposite end on support 74. Support 74 is slidably mounted on a fixed support 205 for limited movement toward and away from the terminal board 12. Latch 76 presents a transverse shoulder 76a normally positioned to engage a shoulder 73a on arm 73 to maintain pin 70 retracted. This may be accomplished by a spring (not shown) acting between support 74 and latch 76 to bias the free end of the latch counterclockwise in the drawing. A tension spring 77 acts between the fixed support 205 and arm 73 to urge arm 73 counterclockwise in Figs. 5 and 6. The movable contact 78 of a normally de-energized relay 79 is connected through a linkage 80 to the free end of latch 76. An abutment 81 is provided on the fixed support 205 which serves to pivot the arm 73 clockwise when the dressing finger D is retracted.

In operation, immediately after the dressing finger D has moved over to the terminal location 62 the dressing finger and wire release mechanism is positioned as shown in Fig. 5. The slidable support 74 for dressing finger D is retracted away from terminal board 12, spring 77 biases arm 73 counterclockwise with the lower end of arm 73 engaging abutment 81 on fixed support 205, and latch 76 engages arm 73 to maintain pin 70 retracted from the forward end 71 of the dressing finger.

Just before the wire-wrapping tools A and B are actuated to wrap the wire around the terminal posts at the terminal locations 55 and 61 on the board, the support 74 for dressing finger D is actuated to move toward the terminal board to the Fig. 6 position, where the forward end 71 of the dressing finger receives the terminal post 62a at the terminal location 62 on the board. At this time, spring 77 is under tension, relay 79 remains de-energized and latch 76 engages arm 73 to maintain pin 70 retracted from the forward end of the dressing finger.

Then, immediately after the wire-wrapping operation takes place, relay 79 is energized instantaneously and through linkage 80 pulls down the free end of latch 76 to release arm 73. Under the influence of spring 77 the arm 73 moves counterclockwise and through linkage 72 it pushes pin 70 forward into engagement with the wire 60. Shoulder 70a on pin 70 engages the dressing finger to limit the forward movement of pin 70 and the counterclockwise movement of arm 73. At the same time the support 74 for dressing finger D is retracted (Fig. 7). The pin 70 holds the wire 60 against board 12 as the forward end 71 of dressing finger D moves back away from the board. In this manner the wire 60 is disengaged from the dressing finger and there is no tendency for it to be pulled back with the dressing finger away from the terminal board 12. Therefore, the wire 60 stays snug against the terminal board, extending closely around the post 62a at terminal location 62 on the board.

As the retraction of the dressing finger continues after this action has taken place pin 70 is retracted with the dressing finger. The lower end of arm 73 engages fixed abutment 81, causing arm 73 to pivot clockwise with respect to the dressing finger support 74. This causes the shoulder 73a on arm 73 to be retracted behind the latch shoulder 76a, so that when the dressing finger is fully retracted the latch 76 moves up into latching position, as shown in Fig. 5.

Figure 3:
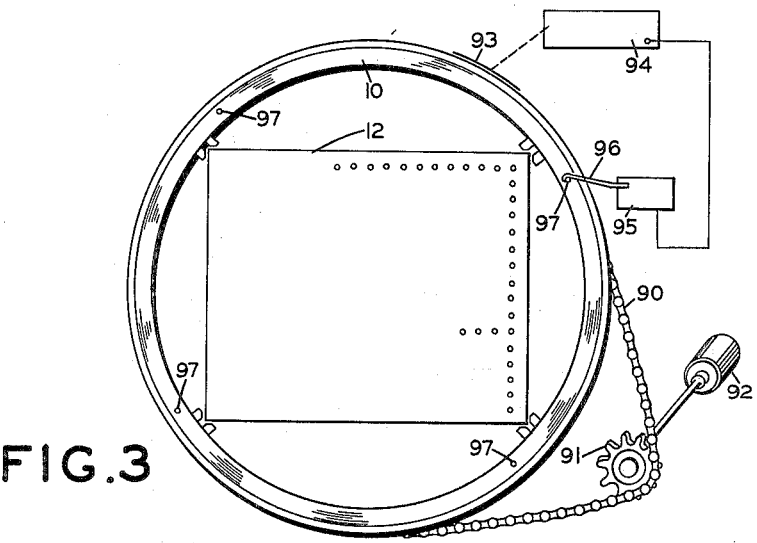
Figure 3 is a schematic view showing the arrangement for adjustably positioning the terminal panel through 90° increments.

In order to facilitate different series wiring operations the terminal board 12 is mounted so as to be turned through 90° increments. To this end, the ring 10 which supports the terminal board is supported rotatably by the frame of the machine (not shown). Ring 10 is provided with a peripheral groove which receives a chain 90 (Fig. 3). Chain 90 is driven by a sprocket 91 driven by motor 92. A brake 93 for the ring 10 is operated by an actuator 94, which in turn is under the control of a snap switch 95. Switch 95 is provided with an operator 96 positioned to be engaged by transverse stop pins 97 located at 90° intervals around ring 10.

When it is desired to shift the position of the terminal board 12 through 90°, the brake 93 is released and motor 92 is energized to drive the ring 10 counterclockwise in Fig. 3. When the next stop pin 97 engages the switch operator 96, switch 95 operates the actuator 94 to move brake 93 into engagement with ring 10, stopping the ring at this position.

In the present invention, because the A tool is movable the terminal panel remains fixed during the wiring of a series of wires to the panel. Much less inertia is involved in moving the A tool to each starting position than if it were necessary to move the terminal panel itself each time. Because of this, the present machine is particularly adapted for high-speed operation.

Also, the novel coaction between the B tool, the wire and the dressing finger enables the B tool to move simultaneously along both the X and Y axes during each wiring operation, which contributes appreciably to the speed of operation of the present machine.

It is to be understood that while there has been described herein and illustrated schematically in the accompanying drawings a particular preferred embodiment of the present invention, various modifications, omissions and refinements which depart from the disclosed embodiment may be adopted without departing from the spirit and scope of this invention.

We claim:

1. In an automatic wiring machine, the combination of a first wire-wrapping tool, a second wire-wrapping tool mounted to be positioned initially adjacent the first tool, means for moving the second tool away from the first tool simultaneously along two transversely disposed coordinate axes, and a dressing finger mounted to be positioned between the first and second tools and movable with the second tool away from the first tool along only one of said axes.

2. In an automatic wiring machine the combination of of a first wire-wrapping tool, a second wire-wrapping tool mounted to be positioned initially adjacent the first tool and to move away from the first tool simultaneously along two mutually transverse coordinate axes across a terminal panel and having provision for carrying the wire with it, and a dressing finger mounted to be positioned initially between the first and second tools and offset therefrom along one of said axes and to move with said second tool along the other of said axes only so that the wire is bent around the dressing finger when carried across the panel by the second tool.

3. In an automatic wiring machine, the combination of a first wire-wrapping tool mounted to be positioned in confronting relation to a terminal panel, a second wire-wrapping tool mounted to be positioned in confronting relation to the panel initially at a location adjacent the first tool and movable across the panel to draw the wire with it away from the first tool along two coordinate axes at right angles to one another, a dressing finger mounted to be positioned in confronting relation to the panel initially at a location intermediate the tools as referred to one of said axes and displaced from the second tool as referred to the other of said axes, means for displacing the second tool across the board away from the first tool simultaneously along both of said axes, and means for moving the dressing finger with the second tool along said one axis only so that the wire is bent around the dressing finger during said movement of the second tool.

4. In an automatic wiring machine, the combination of a terminal panel having a plurality of terminal locations thereon modularly spaced apart along two mutually perpendicular coordinate axes, a first wire-wrapping tool mounted to be positioned at a selected first terminal location on the panel, a second wire-wrapping tool mounted to be positioned initially at a second terminal location spaced from said first terminal location, a dressing finger mounted to be positioned initially at a third terminal location located one module from the second terminal location toward the first terminal location along one of said axes and spaced one module from the second terminal along the other of said axes, means for moving the second tool across the panel away from the first tool along a path involving simultaneous displacement along both of said axes to a fourth terminal location and for moving said dressing finger with the second tool along said one axis only a fifth terminal location spaced one module from said fourth terminal location along said one axis.

5. In an automatic wiring machine, the combination of a terminal panel having a plurality of terminal locations modularly spaced apart thereon along two mutually perpendicular axes, a first terminal post projecting from said panel at a first terminal location thereon, a first wire-wrapping tool mounted to be positioned at said first terminal location, a second wire-wrapping tool mounted to be positioned initially at a second terminal location on the panel spaced from said first terminal location along only one of said axes, a dressing finger mounted to be positioned initially at a third terminal location displaced one module away from said second location toward the first location along said one axis and displaced one module from said second location along the other of said axes, a second terminal post projecting from said panel at a fourth terminal location thereon which is displaced from said second location along said one axis by a predetermined first number of modules and along the other axis by a predetermined second number of modules, a third terminal post projecting from said panel at a fifth location thereon which is displaced from said third location along said one axis by said first number of modules and which is at the same position along said other axis as said third location, means for moving the second tool across the panel from said second location to said fourth location along a path involving simultaneous displacement along both of said coordinate axes to carry a wire with it, and means for moving the dressing finger with the second tool along said one axis only from said third location to said fifth location so that the wire is bent around the dressing finger as it is carried across the panel by the second tool.

6. In an automatic wiring machine, the combination of a first wiring tool; a second wiring tool; means mounting said second wiring tool for displacement in a plane along paths defined by and involving movement simultaneously along two transversely disposed coordinate axes; a dressing finger; and means movably mounting said dressing finger for displacement in said plane jointly with said second wiring tool relative to one of said axes and independently of said second wiring tool relative to the other of said axes.

7. In an automatic wiring machine, the combination of a support for a terminal panel; a first wiring tool; means mounting said first wiring tool for selective movement in a plane parallel to that of a terminal panel in said support to predetermined locations relative to such a terminal panel; means for rotating said support about an axis perpendicular to said plane; a second wiring tool; means mounting said second wiring tool for displacement in said plane along paths defined by and involving movement simultaneously along two transversely disposed coordinate axes; a dressing finger; and means mounting said dressing finger for displacement in said plane jointly with said second wiring tool relative to one of said coordinate axes and for selective displacement independently of said second wiring tool relative to the other of said coordinate axes.

References Cited in the file of this patent

UNITED STATES PATENTS

| | | |
|---|---|---|
| 1,632,075 | Houskeeper | June 14, 1927 |
| 1,823,680 | Curtiss | Sept. 15, 1931 |
| 1,921,485 | Seger | Aug. 8, 1933 |
| 2,627,379 | Moore | Feb. 3, 1953 |
| 2,649,121 | Reck | Aug. 18, 1953 |
| 2,682,065 | Nelson et al. | June 29, 1954 |
| 2,758,515 | Smith | Aug. 14, 1956 |
| 2,770,173 | Ochse | Nov. 13, 1956 |
| 2,862,670 | Mallina | Dec. 2, 1958 |